US012298779B2

(12) United States Patent
Staehlin

(10) Patent No.: US 12,298,779 B2
(45) Date of Patent: May 13, 2025

(54) APPARATUS AND METHOD FOR CONFIDENCE EVALUATION FOR MESSAGES RECEIVED FROM TRAFFIC CONTROL DEVICES

(71) Applicant: Continental Automotive Systems, Inc., Auburn Hills, MI (US)

(72) Inventor: Ulrich Staehlin, Oakland Township, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 17/146,638

(22) Filed: Jan. 12, 2021

(65) Prior Publication Data

US 2022/0221876 A1 Jul. 14, 2022

(51) Int. Cl.
| | | |
|---|---|---|
| G05D 1/02 | (2020.01) | |
| G05D 1/00 | (2006.01) | |
| G08G 1/0967 | (2006.01) | |
| H04W 4/44 | (2018.01) | |

(52) U.S. Cl.
CPC ......... *G05D 1/0285* (2013.01); *G05D 1/0055* (2013.01); *G08G 1/096708* (2013.01); *H04W 4/44* (2018.02); *G08G 1/096783* (2013.01)

(58) Field of Classification Search
CPC .............. G05D 1/0285; G05D 1/0055; G08G 1/096708; G08G 1/096783; H04W 4/44
See application file for complete search history.

(56) References Cited

U.S. PATENT DOCUMENTS

| | | | |
|---|---|---|---|
| 2011/0054716 A1 | 3/2011 | Staehlin et al. | |
| 2014/0324337 A1* | 10/2014 | Bjernetun | B60W 50/0097 |
| | | | 701/450 |
| 2018/0257615 A1* | 9/2018 | Rawashdeh | G06V 20/584 |
| 2019/0001988 A1* | 1/2019 | Ienaga | G08G 1/096783 |
| 2019/0261171 A1* | 8/2019 | Cozzetti | H04W 12/108 |

(Continued)

FOREIGN PATENT DOCUMENTS

| | | |
|---|---|---|
| DE | 102009008959 A1 | 9/2009 |
| DE | 102014201648 A1 | 7/2015 |

(Continued)

OTHER PUBLICATIONS

International Search Report and Written Opinion dated Apr. 7, 2022 from corresponding International patent application No. PCT/US2021/061241.

(Continued)

*Primary Examiner* — Shelley Chen

(57) ABSTRACT

A confidence score (or other measure) that is related to the reliability of map data (MAP) messages is received at a vehicle. Vehicle-to-everything (V2X) messages are received from other vehicles and compared to the MAP-compliant messages. For example, behavior and position of the other vehicles in view of the content of the MAP messages is evaluated for consistency and a numeric score or measure assigned to V2X messages associated with the other vehicles. The score is compared to a threshold and based upon the comparison, a determination can be made as to whether to use the V2X-compliant messages from the other vehicles to perform an action at the vehicle (e.g., control a component of the vehicle).

15 Claims, 4 Drawing Sheets

(56) References Cited

U.S. PATENT DOCUMENTS

| | | | |
|---|---|---|---|
| 2020/0004268 A1* | 1/2020 | Park | G01C 21/3658 |
| 2020/0103919 A1 | 4/2020 | Passmann et al. | |
| 2020/0139979 A1* | 5/2020 | Kawanai | G08G 1/166 |
| 2022/0097708 A1* | 3/2022 | Jin | G06V 10/766 |

FOREIGN PATENT DOCUMENTS

| | | |
|---|---|---|
| DE | 102018204500 A1 | 9/2019 |
| DE | 102018216795 A1 | 4/2020 |
| EP | 3267418 A1 | 1/2018 |

OTHER PUBLICATIONS

"SPaT Challenge Webinar Series #6: Deployment and Validation", Jun. 12, 2018, AASHTO, Its America, ITE, https://transportationops.org/spatchallenge, amazonaws.com.

\* cited by examiner

APPARATUS AND METHOD FOR CONFIDENCE EVALUATION FOR MESSAGES RECEIVED FROM TRAFFIC CONTROL DEVICES

TECHNICAL FIELD

This patent relates to the determination as to whether V2X-compliant messages received from other vehicles are reliable based at last in part using map data (MAP)-compliant messages received from traffic control devices.

BACKGROUND

Traffic lights (and potentially other types of traffic control devices) sometimes send map data (MAP) messages. Among other things, MAP messages include the physical description or topology of roadway features such as intersections (e.g., the physical configuration of an intersection). After being sent by the traffic control device, a vehicle receives the messages as sent. Various actions are performed at the vehicle (including controlling components of the vehicle) based upon the MAP messages.

However, sometimes the sender of the messages may include incorrect information or the information may be unreliable in other respects. The inclusion of incorrect information may be intentional or unintentional. When the information is incorrect or otherwise unreliable, the actions performed by the vehicle may not optimal. In some other situations where the information has been intentionally corrupted, the results may be dangerous.

BRIEF DESCRIPTION OF THE DRAWINGS

For a more complete understanding of the disclosure, reference should be made to the following detailed description and accompanying drawings wherein.

Figure 1:
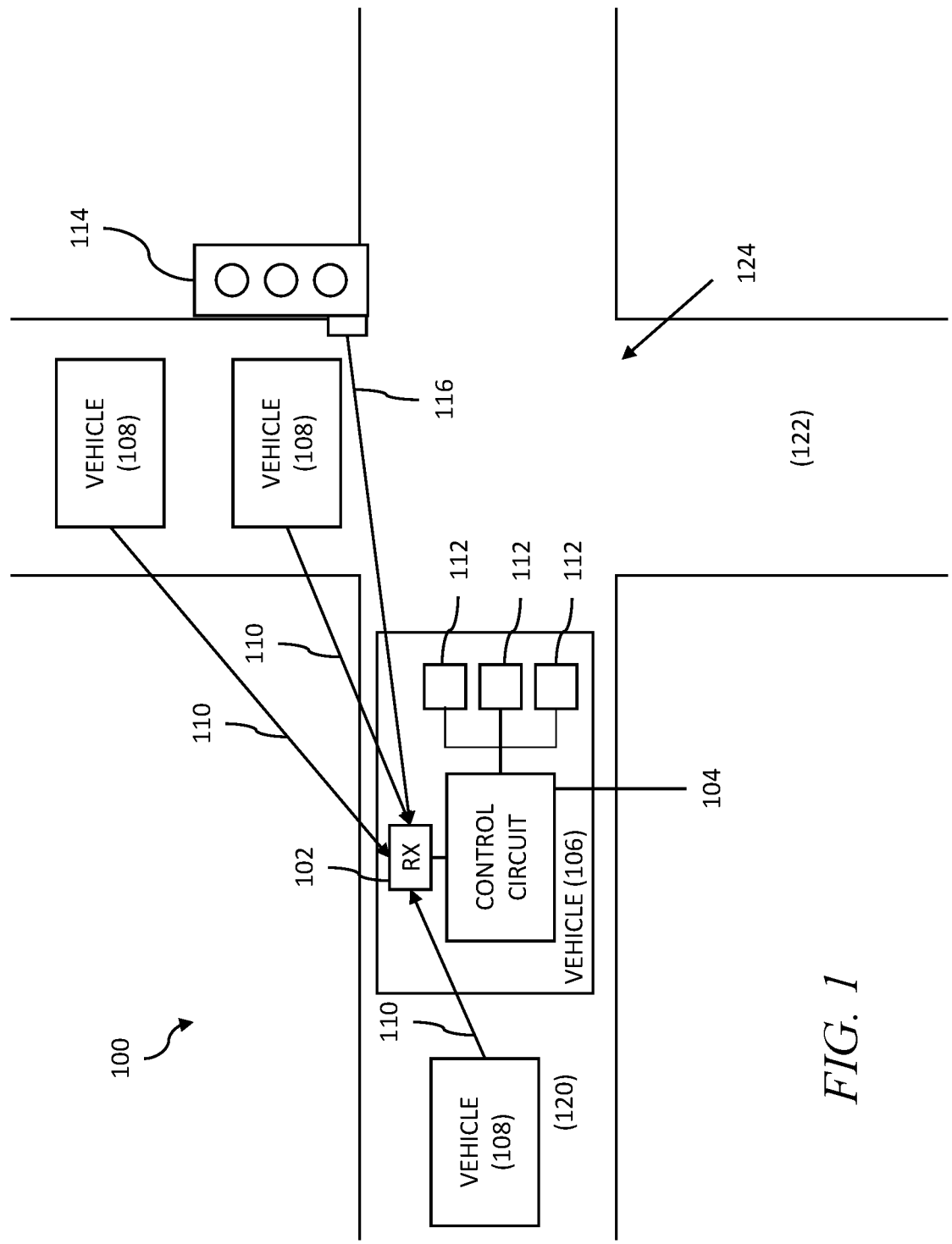
FIG. 1 comprises a diagram of a system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The approaches described herein determine a confidence score (or other measure) that is related to the reliability of map data (MAP) messages received at a vehicle. Vehicle-to-everything (V2X) messages are received from other vehicles and compared to the MAP messages. For example, behavior and position of the other vehicles in view of the content of the MAP-compliant messages is evaluated for consistency and a numeric score or measure assigned to V2X messages associated with the other vehicles. The score is compared to a threshold and based upon the comparison, a determination can be made as to whether to use the V2X messages from the other vehicles to perform an action at the vehicle (e.g., control a component of the vehicle). In other words, the veracity of messages from other vehicles is judged and actions taken at a vehicle based upon a determined confidence level of these messages.

Advantageously, the present approaches rely upon a comparison of electronically transmitted information (from, e.g., traffic lights and other vehicles) and not upon images of the traffic light. Effectively, a correlation between this information is performed and a score determined. Based upon the score, various actions can be taken (or not taken). The approaches are quick to perform and reliable. Unneeded processing (e.g., image processing of images of traffic lights) is not required.

As used herein, MAP-compliant and V2X-compliant messages refer to messages or other communications that follow any version of the MAP and V2X protocols. However, these terms also cover messages that are compliant with these protocols. That is, minor or insubstantial changes to standard MAP and V2X protocol messages (e.g., rearrangement of information, dropping of some information from the messages) are also covered in the approaches are described herein.

In many of these embodiments, a method is performed at a vehicle. In the method, a map data (MAP)-compliant message is received from a traffic safety device. The MAP-compliant message describes geographic transportation features in the vicinity of the traffic light. V2X-compliant messages are received from a plurality of different vehicles in the vicinity of the traffic light.

For each V2X-compliant message, contents of the MAP-compliant message are compared to contents of each V2X-compliant messages. Based upon the comparing, a confidence level is determined for each V2X-compliant message that the contents of the V2X-compliant message from the plurality of different vehicles are correct, reliable, or accurate. For each determined confidence level related to each V2X message, the confidence level is compared to a predetermined threshold.

For each confidence level related to each V2X message, when the confidence level is below the predetermined threshold, a first action is prevented (or blocked) from being taken at the vehicle.

For each confidence level related to each V2X message, when the confidence level is above the predetermined threshold, a second action is performed at the vehicle.

The first action controls the operation of first components of the vehicle and the second action controls second components of the vehicle. The first action and the second action may be the same or different.

In aspects, the traffic safety device comprises a traffic light or other safety device. Other examples are possible.

In examples, the geographic transportation features comprise geographic position information concerning an intersection and streets comprising the intersection. Other examples are possible.

In other examples, comparing the contents of the MAP-compliant message to each of the contents of the V2X-compliant messages comprises determining whether one or more of movement, speed, acceleration, heading, or location of the plurality of vehicles is consistent with contents of the MAP-compliant message. Other examples are possible.

In other aspects, the first action and second action control braking components of the vehicle, control engine components of the vehicle, control steering components of the vehicle, or send instructions via a communication network.

In other examples, the vehicle is an automated vehicle or a semi-automated vehicle. Other examples of vehicles are possible.

In others of these embodiments, a system is disposed at a vehicle and includes a receiver and a control circuit.

The receiver is configured to receive a map data (MAP)-compliant message from a traffic safety device. The MAP-compliant message describes geographic transportation features of in the vicinity of the traffic light. The receiver is configured to receive V2X-compliant messages from a plurality of different vehicles in the vicinity of the traffic light.

The control circuit is coupled to the receiver. The control circuit is configured to, for each V2X-compliant message, compare contents of the MAP-compliant message to contents of each V2X-compliant messages, and based upon the comparison determine a confidence level for each V2X-compliant message that the contents of the V2X-compliant message are correct, reliable, or accurate. The control circuit is configured to, for each determined confidence level related to each V2X-compliant message, compare the confidence level to a predetermined threshold. The control circuit is configured to, for each confidence level related to each V2X-compliant message and when the confidence level is below the predetermined threshold, prevent a first action from being taken at the vehicle. The control circuit is configured to, for each confidence level related to each V2X message and when the confidence level is above the predetermined threshold, perform a second action at the vehicle. The first action controls the operation of first components of the vehicle and the second action controls second components of the vehicle. The first action and the second action may be the same or different.

In others of these embodiments, a computer readable non-transitory medium has a computer readable program code embodied therein. The computer readable program code is adapted to be executed to implement a method, the method is performed at a vehicle.

The method includes receiving a map data (MAP)-compliant message from a traffic safety device, the MAP-compliant message describing geographic transportation features of in the vicinity of the traffic light; and receiving V2X-compliant messages from a plurality of different vehicles in the vicinity of the traffic light.

The method further includes, for each V2X-compliant message, comparing contents of the MAP-compliant message to contents of each V2X-compliant messages, and based upon the comparing determining a confidence level for each V2X-compliant message that the contents of the V2X-compliant message are correct, reliable, or accurate.

The method still further includes, for each determined confidence level related to each V2X-compliant message, comparing the confidence level to a predetermined threshold; for each confidence level related to each V2X-compliant message and when the confidence level is below the predetermined threshold, preventing a first action from being taken at the vehicle; and for each confidence level related to each V2X-compliant message and when the confidence level is above the predetermined threshold, performing a second action at the vehicle.

The first action controls the operation of first components of the vehicle and the second action controls second components of the vehicle. The first action and the second action may be the same or different.

Referring now to FIG. 1, a system 100 includes a receiver 102 and a control circuit 104. The receiver 102 and the control circuit 104 are disposed in a vehicle 106. Other vehicles 108 transmit V2X-compliant messages 110 that are received at the receiver 102. The control circuit 104 couples to the receiver 102. The control circuit 104 also couples to vehicle modules 112, which as explained below may in aspects control aspects of operation of the vehicle 106. A traffic control device (e.g., a traffic light) 114 transmits MAP-compliant messages 116 that are received at the receiver 102. The vehicle 106 and other vehicles 108 operate and maneuver over roads 120 and 122, which converge at an intersection 124. The traffic control device 114 is deployed at the intersection 124 in appropriate structure (e.g., by poles, wires, brackets, to mention a few examples). It will be appreciated that the traffic control device may not be a traffic light, but an apparatus located at a curve, hill, or some other transportation feature. This apparatus may itself include a control circuit, flashing lights, or other devices to mention a few examples.

The receiver 102 is any type of receiving device that is configured to receive any type of electronic transmission. That is, the receiver 102 is configured to receive transmitted communications in different frequencies, power levels, and having other parameters. More specifically, the receiver 102 is configured to receive V2X-compliant messages 110 from a plurality of vehicles 108 in the immediate vicinity of the traffic control device (e.g., traffic light) 114. The V2X-compliant messages 110 describe operational, locational, and/or positional information (e.g., position, direction, speed, and acceleration) concerning the vehicles 108. The receiver 102 is also configured to receive a MAP-compliant message 116 from the traffic control device 114. The MAP-compliant message indicates geographic, topological, and/or transportation-related information of the area located around the traffic control device 114. For example, the dimensions, structure, and shape of roads or the transportation-related features about the traffic control device 114 are described. If at an intersection, dimensions, positions, location and other features of left or right turning lanes at the intersection may be described. The receiver 102 receives these messages, and may convert the messages from one format to another or may provide other processing of the received messages. The receiver 102 comprises any combination of electronic/hardware or computer software to implement these functions.

In other examples, the receiver 102 is a transmitter as well as a receiver and is configured to transmit messages from the vehicle 106. In still other examples, a separate transmitter is used to transmit messages and other communications from the vehicle 106. In examples, these other messages are V2X messages.

The vehicle 106 is any type of vehicle. For example, the vehicle 106 may be a fully automated vehicle (e.g., all driving functions are performed automatically), a partially automated vehicle (e.g., some driving functions are performed automatically), or a manually controlled vehicle (e.g., no driving functions are performed automatically). The vehicle 106 may be a passenger car, a truck, a ship, a drone, an aircraft, or some other type of ground vehicle. Other examples of vehicles are possible. Driving functions include all functionality that controls any function of the vehicle or accessories of the vehicle (e.g., steering, braking, starting, deactivation, etc).

Similarly, the vehicles 108 are also any type of vehicle. For example, the vehicles 108 may be fully automated vehicles (e.g., all driving functions are performed automatically), partially automated vehicles (e.g., some driving functions are performed automatically), or manually controlled vehicles (e.g., no driving functions are performed automatically). The vehicles 108 may be passenger cars, trucks, ships, drones, aircraft, or some other type of ground vehicle. Other examples of vehicles are possible. The vehicles 108 may be a mixture of these vehicles (e.g., some automated, some not automated, etc.).

The V2X-compliant messages 110 includes messages that follow or are compliant with various V2X protocols. For example, the messages may include the position, direction of travel, speed, acceleration, or other information concerning positional, directional, or operational information concerning the vehicles 108. The messages 110 may also include identification information concerning the vehicles 108.

The MAP-compliant message 116 follows the MAP protocol or is compliant with the MAP protocol. For example, the messages may include the topology, dimensions, structure, and shape of roads or the transportation-related features about the light 114 are described. If at an intersection, dimensions positions, location and other features of left or right turning lanes may be described. If the traffic control device 114 is disposed at a curve, then the shape, dimensions, diameter, slope, grade, or the other parameter of the curve may be described. Other examples are possible.

The vehicle modules (or systems or subsystems) 112 control aspects of vehicle operation, communicate with other systems, or otherwise relate to the operation of the vehicle 106. For example, the vehicle modules 112 may control braking components of the vehicle 106, control engine components of the vehicle 106, control steering components of the vehicle 106, or send instructions via a communication network within or outside the vehicle 106 (e.g., where this communication network communicates with other vehicle components or systems). Other examples are possible.

In these regards, the control circuit 104 may send electronic control signals to these components, and the components are controlled, operated, and/or configured according to these control signals. For instance, a brake control signal may be sent to actuate the brakes of the vehicle 106. A lighting control signal may be sent to the headlamps of the vehicle 106. An engine control signal may be sent to the engine that controls the speed of the engine of the vehicle 106. A steering control signals causes the steering system of the vehicle 106 to maneuver the vehicle 106 to different locations and according to various paths. Other examples are possible. It will be appreciated that these actions may cause the vehicle 106 to physically change actions, change states of operation, and interact with the physical environment in which the vehicle 106 operates.

It will be appreciated that the vehicle modules (or systems or subsystems) 112 are collections of components and structures. For example, a braking control module may include the actual brake, mechanical connectors to the brake, wires, and a control circuit (or other processing device) that controls the operation of the brake. In other examples, a lighting control system for a head lamp may include the head lamp and wires to the head lamp (e.g., there may not be the need for a separate control circuit). As mentioned elsewhere herein, some or all of the modules 112 may be coupled to the control circuit 104 by an in-vehicle network, which may be wired or wireless (or combinations of wired and wireless). Other examples and combinations of components and structures are possible.

The traffic control device 114 is any type of traffic control device such as a traffic light. The traffic control device 114 includes a transmitter that transmits the MAP-compliant messages to the vehicle 106 (and all other vehicles in the vicinity of the traffic control device 114. The traffic control device 114 may include a control circuit (or other processing device) to assemble the MAP messages. Information included in the MAP messages may be entered by a user either at the traffic control device 114 or remotely. The traffic control device 114 may include lamps, lenses, lights, or other structures that display traffic control information to motorists (e.g., the traffic control device 114 may be a standard traffic light). In other examples, the traffic control device 114 is not a light but an apparatus deployed at a suitable geographic location near a transportation feature (e.g., a curve in the road).

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 104 may be configured (for example, by using corresponding programming stored in a memory as will be well understood by those skilled in the art) to carry out one or more of the steps, actions, and/or functions described herein. The control circuit 104 may include a memory that includes computer instructions that implement any of the functions described herein.

The control circuit 104 is configured to, for each V2X-compliant message, compare contents of the MAP-compliant message 116 to contents of each V2X-compliant messages, and based upon the comparison determine a confidence level for each V2X-compliant message 110 that the contents of the V2X-compliant message 110 are reliable, correct, and/or accurate. The confidence level may be a number (e.g., integer or real number) or any other indicator of a confidence. As mentioned, the confidence level represents an estimation of certainty or confidence that the V2X-compliant message is correct for each V2X message 110 for each of the other vehicles 108. In aspects, this represents confidence that the other vehicles 108 have included correct information in the messages 110 or that a nefarious actor has not corrupted, changed, highjacked, or mimicked the messages 110. In many of the examples described herein, a separate confidence level is computed and analyzed for each of the other vehicles 108 and a separate action (if any) determined for the vehicle 106; this may include an average, median, or mean (or some other level of) confidence for each of the vehicles 108 (based on an average, median, or mean of all confidences for each vehicle 108 over a time period), or may involve an evaluation and reaction to each message from each of the vehicles 108. In still other examples, an average, median, or mean confidence level can be determined for all vehicles 108 that have sent V2X messages and actions taken (or blocked) based upon the average, median, or mean (or some other) confidence level.

The control circuit 104 is configured to compare the confidence level to a predetermined threshold. The predetermined threshold may be set by a user and may be estimated based upon previous historical information and evaluation of the information. For example, if the confidence level is on a scale of 0 to 10, a threshold of 9 may be used when it is determined that few traffic problems (e.g., accidents) would be likely to occur above that level, but a significant number of issues may occur below that level.

The control circuit 104 is configured to, when the confidence level is below the predetermined threshold, prevent a first action from being taken at the vehicle. Preventing an action may involve sending instructions to a vehicle component to block the component (e.g., turn off or deactivate the component) or may involve not sending instructions at all (e.g., allowing the component to operate according to its current state or according to a current set of instructions). Other examples of blocking or preventing actions are possible.

The control circuit 104 is configured to, when the confidence level is above the predetermined threshold, perform a second action at the vehicle 106.

As mentioned, the first action controls the operation of first components of the vehicle 106 and the second action controls second components of the vehicle 106. The first and second actions may be the same or different. The components may be the same or different. To take one example, the first action may be the activation of the brakes of the vehicle 106 and the second action may be the activation of brakes of the vehicle 106. In another example, the first action may be the activation of the brakes of the vehicle 106 and the second action may be the deactivation of brakes of the vehicle 106. In yet another example, the first action may be the activation of the brakes of the vehicle 106 and the second action may be the activation of the head lights of the vehicle 106. Other examples and combinations are possible.

In examples, the first action and second action control braking components of the vehicle 106, control engine components of the vehicle 106, control steering components of the vehicle 106, or send instructions via a communication network. The communication network may be a controller area network (CAN) or ethernet to mention two examples. The network can be deployed in the vehicle 106 and the network may be coupled directly to other vehicle components. Other examples are possible.

In other examples, comparing the contents of the MAP-compliant message to each of the contents of the V2X-compliant messages comprises determining whether one or more of movement, speed, acceleration, heading, or location of the plurality of vehicles 108 is consistent with contents of the MAP-compliant message.

In yet other examples, comparing the contents of the MAP-compliant message 116 to the contents of the V2X-compliant messages 110 by the control circuit 104 comprises determining whether one or more of movement, speed, acceleration, heading, or location of the plurality of the vehicles 108 is consistent with contents of the MAP-compliant message 116. For example, if the MAP data describes an intersection, then the comprising can determine if the movement of the other vehicles 108 is consistent with movement around an intersection.

It will be appreciated that the other vehicles 108 may include the same or similar structures (e.g., control circuit 104, receiver 102, and vehicle modules 112) as the vehicle 106. Consequently, the operations as performed at the vehicles 108 may be the same as those described herein as occurring at the vehicle 106. The vehicle 106 can also transmit V2X messages to the other vehicles.

Figure 2:
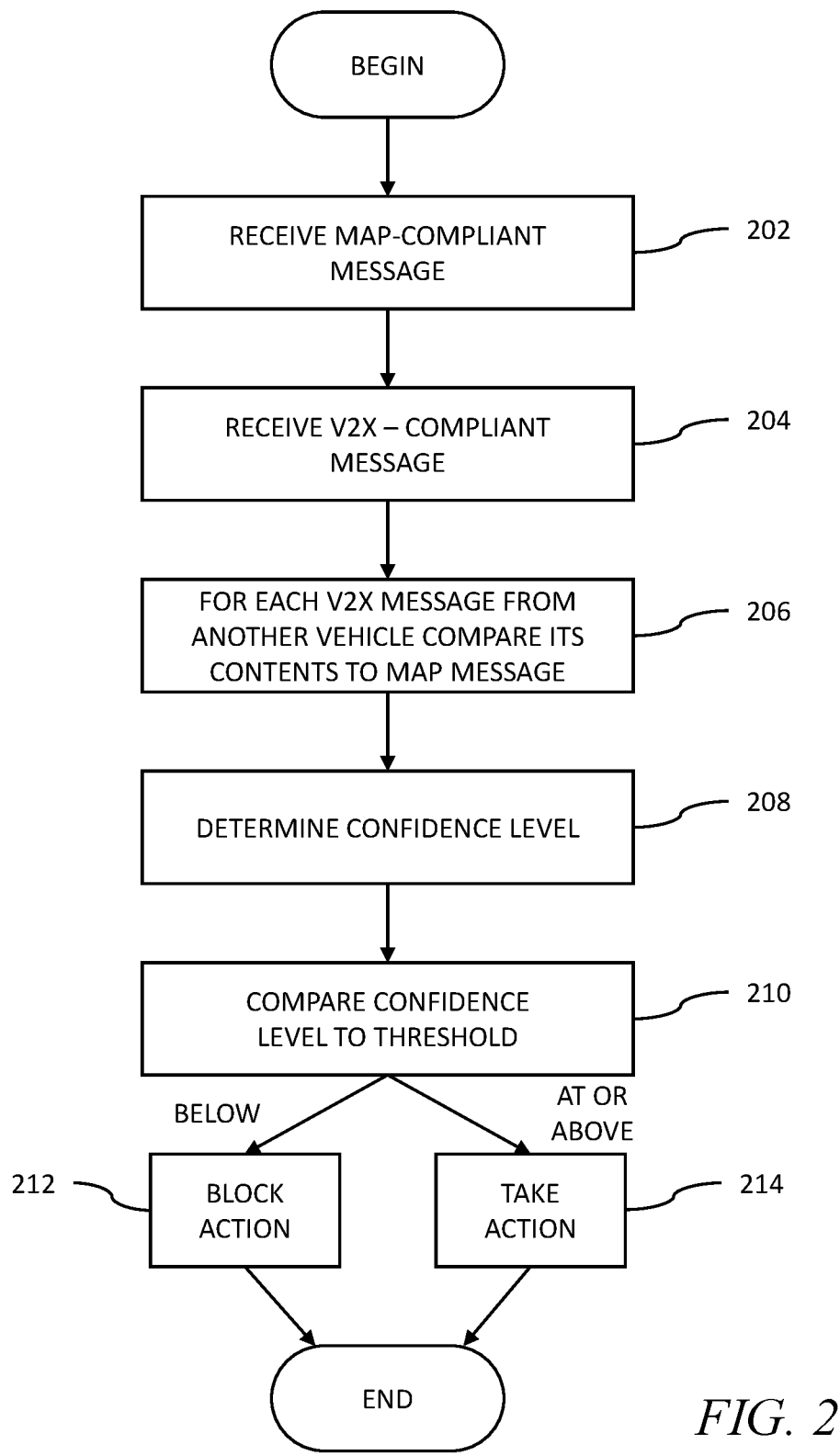
FIG. 2 comprises a flowchart of an approach according to various embodiments of the present invention.

Referring now to FIG. 2, one example of an approach for determining the confidence of V2X-compliant messages received from other vehicles is described. These steps are performed for each V2X message that is received and a potential action (or inaction) performed or taken. In this example, "vehicle" refers to the vehicle where messages are received and actions taken (or blocked) and the term "other vehicle" refers to other vehicles that send V2X messages to the vehicle.

At step 202 and at a vehicle, a map data (MAP)-compliant message is received from a traffic control device (e.g., traffic light). The MAP-compliant message indicates geographic transportation features in the vicinity of the traffic control device. For example, the topology, configuration, layout, dimensions or other features of an intersection such as the roads comprising an intersection, turning lanes (left and right) at the intersection, or other features may be described in the MAP-compliant message. In another example and when the geographic transportation is a curve, the dimensions, slope, radius, and layout of the curve may be described in the MAP-compliant message.

At step 204 and at the vehicle, V2X-compliant messages are received from a plurality of vehicles in the immediate vicinity of the traffic control device. The V2X-compliant messages, in aspects, may include the position, speed, direction of travel, bearing, acceleration, identity, or other characteristics of the vehicle. Other examples are possible.

At step 206 and at the vehicle, contents of the MAP-compliant message are separately compared to contents of each the V2X-compliant messages. The contents are first extracted and a comparison is made to determine if the informational contents of the MAP-compliant message are consistent with the informational content of each V2X-compliant message. To take one example, V2X-compliant messages from a first other vehicle indicates that it is positioned at or near an intersection. More specifically, the position (from the V2X data) may indicate that the first other vehicle is in the left turning lane (as shown by the MAP data) and a speed value in the V2X-message may indicate that the first other vehicle is stopped. If the vehicle is approaching the first other vehicle, the vehicle may be caused to slow down (e.g., by actuating the brake system) so that the vehicle does not collide with the first other vehicle.

At step 208, at the vehicle, and based upon the comparing, a confidence level, score, or measure that the contents of each V2X-compliant message is reliable, correct, or accurate is determined. Taking the current example, the V2X data (position and speed of the first other vehicle) is consistent with the MAP data (showing that there is a left turning lane and that the first other vehicle is positioned in the left turning lane). For example, if a great level of consistency is shown, the confidence level may be set to a high value. In the present example, given the MAP data and V2X data are consistent and (if the confidence level is on a 0 to 10 scale) the confidence level may be set to a 9.

At step 210, the confidence level is compared to a predetermined threshold. The predetermined level may be set by the user and may be dynamic and adjustable.

At step 212 and when the confidence level is below the predetermined threshold, a first action is prevented (or blocked) from being taken at the vehicle.

At step 214, and when the confidence level is above the predetermined threshold, a second action at the vehicle is performed.

In aspects, the first action controls the operation of first components of the vehicle and the second action controls second components of the vehicle. The first action and the second action may be the same or different.

Figure 3:
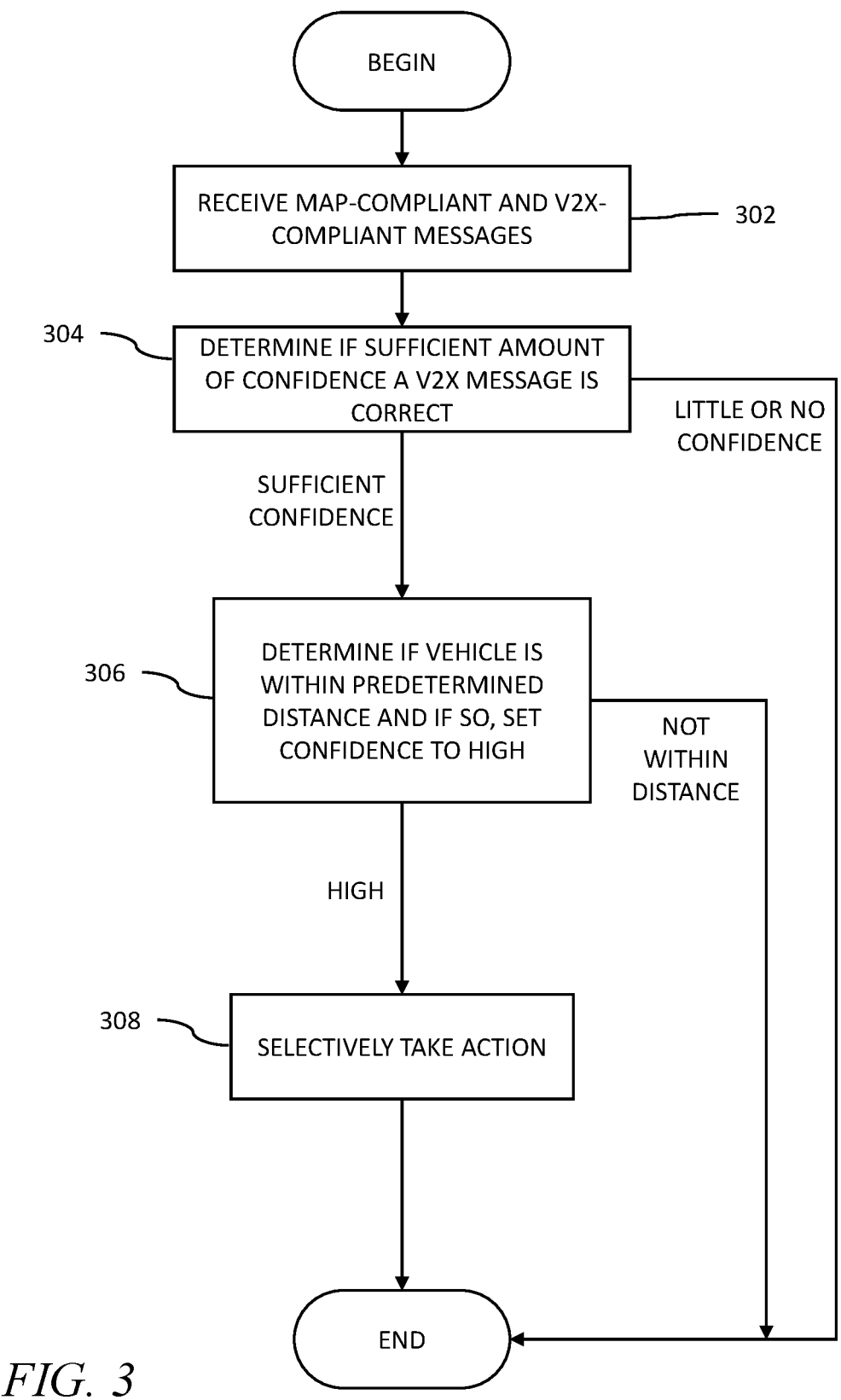
FIG. 3 comprises diagram illustrating aspects of the operation of the approaches described herein according to various embodiments of the present invention.

Referring now to FIG. 3, one example of an approach for comparing MAP-compliant messages and V2X-compliant messages is described. It will be appreciated that this approach is only one example and that other examples are possible. The approach may be, in one example, implemented as computer instructions executed on a processing device (e.g., control circuit 104 as described in FIG. 1). In this example, "vehicle" refers to the vehicle where messages are received and actions taken (or blocked) and the term "other vehicle" refers to other vehicles that send V2X messages to the vehicle.

At step 302, the V2X-compliant messages (e.g., from other vehicles 108) and the MAP-compliant messages (e.g., from traffic control device 114) are received at a vehicle (e.g., the vehicle 106 as described in FIG. 1). After receipt, the message contents are extracted. The topology of an intersection may be obtained from the MAP-compliant message. The position, speed, heading, and acceleration are extracted from the each V2X-compliant message for each of the other vehicles.

At step 304, it is determined if there is a sufficient amount of confidence that the V2X message is reliable, correct, or accurate. If the answer is that there is little or no confidence, then execution ends. If there is sufficient confidence, then execution continues at step 306.

In one example, if V2X data from an intersection shows that the other vehicle is moving at an unlikely speed (e.g., 150 mph), then the V2X data is assumed to be unreliable and execution ends. If the V2X data shows that the vehicle is stopped in the general vicinity of the intersection, then the V2X data may be viewed as reliable and execution continues at step 306.

At step 306, the position of the other vehicle is compared to the MAP data in the MAP-compliant message. A determination is made as to whether the other vehicle is within a predetermined distance (e.g., +/−3 feet) of what the MAP-compliant message data suggests is a good, accurate, or possible position. To take one example, a determination is made that the other vehicle is on the road or in a particular turning lane. If the answer at step 306 is negative, then execution ends. However, if the vehicle is within the predetermined distance of an acceptable position, then confidence is very high that the V2X-compliant message is accurate for the other vehicle and action at the vehicle can be taken at step 308. If the V2X message also includes a value describing the senders estimated position accuracy, e.g. +/−10 feet, the check is done using this boundary to define the confidence.

At step 308, an action can be instigated based on the confidence score being above (or at) a threshold), e.g., sending a control signal to a vehicle system or component to actuate or deactivate the component. For instance, there may be high confidence that the other vehicle has stalled at the side of the road and, consequently, a warning message displayed at a display device to a driver, the brakes of the vehicle actuated, or the steering adjusted.

Figure 4:
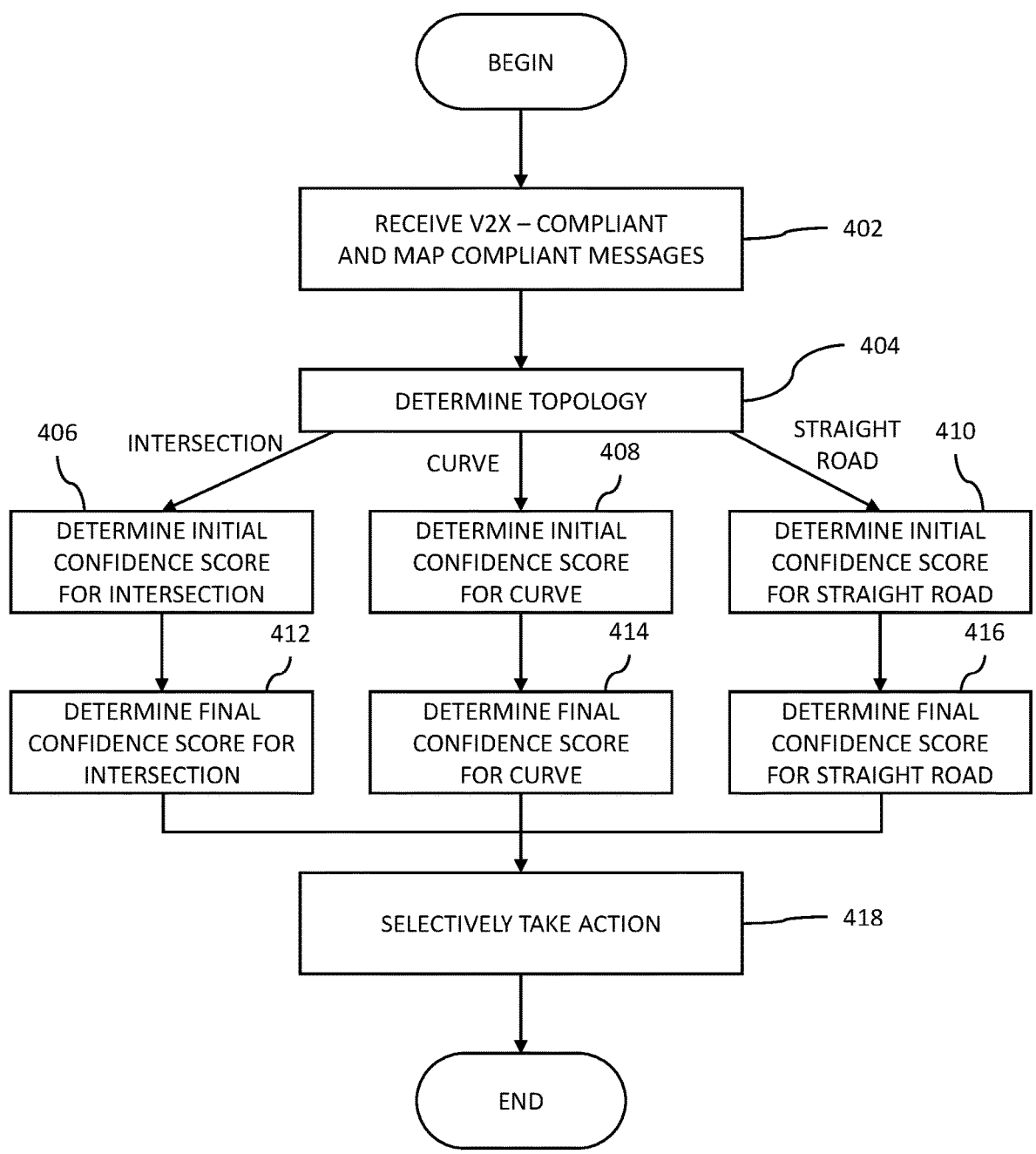
FIG. 4 comprises diagram illustrating aspects of the operation of the approaches described herein according to various embodiments of the present invention.

Referring now to FIG. 4, an example of using different and multiple comparisons to determine a confidence level is described. As with the example of FIG. 3, it will be appreciated that this approach is only one example and that other examples are possible. The approach may be, in one example, implemented as computer instructions executed on a processing device (e.g., control circuit 104 as described in FIG. 1). It will be appreciated that the approach of FIG. 4 is different from the approach of FIG. 3 and makes different evaluations.

At step 402, the V2X-compliant messages and the MAP-compliant messages are received at a vehicle (e.g., the vehicle 106 as described in FIG. 1). After receipt, message contents are extracted. Topology information may be extracted from the MAP-compliant message and speed, position, and direction data extracted from the V2X messages from a first other vehicle. In this example, "vehicle" refers to the vehicle where messages are received and actions taken (or blocked) and the term "other vehicle" refers to other vehicles that send V2X messages to the vehicle.

At step 404, it is determined what feature or features the topology information indicate. The topology may be an intersection, curve, hill, or other feature. The topology may also indicate more detailed features (e.g., if an intersection, the topology, dimensions, and layout of turning lanes). Based upon the topology determined at step 404, particular steps are taken depending on the topology: step 406 (for an intersection topology), 408 (for a curve topology), and 410 (for a straight-line road topology). It will be appreciated that there may be other topologies, but only three are shown here for the sake of simplicity.

At steps 406, 408, and 410 and for the topology indicated in the MAP-compliant message, an initial confidence is determined that the speed, and direction match the general characteristics of a feature. For instance, if the vehicle is at a curve (and step 408 is being executed), but the speed shows 200 mph, then this may be assumed to be not likely since vehicles would typically not be able to withstand turning a curve at that speed. On the other hand, if the topology relates to an intersection (Step 406 is being executed), and the vehicle is at stop or moving at the speed limit at that location, then it can be assumed that these readings are consistent with the topology at the intersection. If step 410 is being executed (the topology indicates a straight-line road), the direction of other vehicles can be checked to see if this direction changes over time (e.g., if starlight line road, the vehicle should not swerve). Any of these steps (406, 408, or 410) also may examine the general position of the other vehicle and make an initial determination that the other vehicle is somewhere on the road (e.g., not in the grass off the road).

If steps 406, 408 or 410 indicate some initial level of confidence, then steps 412, 414, and step 416 are executed. With any of these steps, a comparison is made between the MAP data and the position of the vehicle (as indicated by the V2X-compliant message). If the position of the vehicle (as indicated by the V2X-compliant message) is within a certain range of acceptable positions (also taking into account a potentially received accuracy of the position), then a high degree of confidence is assigned. Other confidence levels can be assigned if the confidence is lower. For example, if the other vehicle is expected to be on the road, and its position according to the MAP data shows it is on the road then a high confidence level is assigned. In another example, if the other vehicle is expected to be on the road, and its position according to the MAP data shows it is slightly off the road then a medium confidence level is assigned. In another example, if the other vehicle is expected to be on the road, and its position according to the MAP data shows it is 1000 feet from the road then a low confidence level is assigned.

In one example, confidence levels are assigned values between 0 and 10. A high confidence level may be a 9, a medium a 6, and a low a 1. Any of these steps may add specificity to the outcome of steps 406, 408, and 410. For instance, steps 406, 408, and 410 may indicate that vehicle is generally on the road, but steps 412, 414, and 416 may determine where on the road the vehicle is located with a certain percentage of error (e.g., within a left turn lane, 12 inches from the side of the road, or on the road shoulder). To take yet another example, steps 406, 408, and 410 determine that the vehicle is not in the grass or is on the road, while steps 412, 414, and 416 look at an "error" percentages (the other vehicle is within 3 feet of where the MAP message data indicates is a good or acceptable position, e.g., in the left turning lane).

At step 418, an action can be instigated based on the confidence score being above (or at) a threshold), e.g., sending control signal to a vehicle system or component to actuate or deactivate the component. For instance, there may be high confidence that the other vehicle has stalled at the side of the road and, consequently, a warning message displayed to a driver, the brakes of the vehicle actuated, or the steering adjusted.

It should be understood that any of the devices described herein (e.g., the control circuits, the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method, the method comprising:
at a vehicle:
receiving a map data (MAP)-compliant message from a traffic safety device, the MAP-compliant message describing geographic transportation features in the vicinity of the traffic safety device;
receiving V2X-compliant messages from a plurality of different vehicles in the vicinity of the traffic safety device;
for each V2X-compliant message, comparing contents of the MAP-compliant message to contents of each V2X-compliant messages, and based upon the comparing determining a confidence level for each V2X-compliant message that the contents of the V2X-compliant message are correct, wherein comparing the contents of the MAP-compliant message to each of the contents of the V2X-compliant messages comprises determining whether one or more of movement, speed, acceleration, heading, or location of the plurality of vehicles is consistent with one or more of dimensions, structure, and shape of roads specified in the MAP-compliant message;
for each determined confidence level related to each V2X-compliant message, comparing the confidence level to a predetermined threshold,
for each confidence level related to each V2X-compliant message and when the confidence level is below the predetermined threshold, preventing a first action from being taken at the vehicle;
for each confidence level related to each V2X-compliant message and when the confidence level is above the predetermined threshold, performing a second action at the vehicle;
wherein the first action controls the operation of first components of the vehicle and the second action controls second components of the vehicle, wherein the second action includes at least one of: controlling braking components of the vehicle, controlling engine components of the vehicle, and controlling steering components of the vehicle.

2. The method of claim 1, wherein the traffic safety device comprises a traffic light or other safety device.

3. The method of claim 1, wherein the geographic transportation features comprise geographic position information concerning an intersection and streets comprising the intersection.

4. The method of claim 1, wherein the first action and second action control braking components of the vehicle, control engine components of the vehicle, control steering components of the vehicle, or send instructions via a communication network.

5. The method of claim 1, wherein the vehicle is an automated vehicle or a semi-automated vehicle.

6. A system, the system being disposed at a vehicle, the system comprising:
a receiver, the receiver configured to receive a map data (MAP)-compliant message from a traffic safety device, the MAP-compliant message describing geographic transportation features in the vicinity of the traffic safety device, the receiver configured to receive V2X-compliant messages from a plurality of different vehicles in the vicinity of the traffic safety device;
a control circuit, the control circuit coupled to the receiver, the control circuit configured to:
for each V2X-compliant message, compare contents of the MAP-compliant message to contents of each V2X-compliant messages, and based upon the comparison determine a confidence level for each V2X-compliant message that the contents of the V2X-compliant message are correct, wherein comparing the contents of the MAP-compliant message to each of the contents of the V2X-compliant messages comprises determining whether one or more of movement, speed, acceleration, heading, or location of the plurality of vehicles is consistent with one or more of dimensions, structure, and shape of roads specified in the MAP-compliant message;

for each determined confidence level related to each V2X-compliant message, compare the confidence level to a predetermined threshold, for each confidence level related to each V2X-compliant message and when the confidence level is below the predetermined threshold, prevent a first action from being taken at the vehicle;

for each confidence level related to each V2X-compliant message and when the confidence level is above the predetermined threshold, perform a second action at the vehicle;

wherein the first action controls the operation of first components of the vehicle and the second action controls second components of the vehicle, wherein the second action includes at least one of: controlling braking components of the vehicle, controlling engine components of the vehicle, and controlling steering components of the vehicle.

7. The system of claim 6, wherein the traffic safety device comprises a traffic light or other safety device.

8. The system of claim 6, wherein the geographic transportation features comprise geographic position information concerning an intersection and streets comprising the intersection.

9. The system of claim 6, wherein the first action and second action control braking components of the vehicle, control engine components of the vehicle, control steering components of the vehicle, or send instructions via a communication network.

10. The system of claim 6, wherein the vehicle is an automated vehicle or a semi-automated vehicle.

11. A computer readable non-transitory medium having a computer readable program code embodied therein, the computer readable program code adapted to be executed to implement a method, the method comprising:

at a vehicle:
receiving a map data (MAP)-compliant message from a traffic safety device, the MAP-compliant message describing geographic transportation features in the vicinity of the traffic safety device;

receiving V2X-compliant messages from a plurality of different vehicles in the vicinity of the traffic safety device;

for each V2X-compliant message, comparing contents of the MAP-compliant message to contents of each V2X-compliant messages, and based upon the comparing determining a confidence level for each V2X-compliant message that the contents of the V2X-compliant message are correct, wherein comparing the contents of the MAP-compliant message to each of the contents of the V2X-compliant messages comprises determining whether one or more of movement, speed, acceleration, heading, or location of the plurality of vehicles is consistent with one or more of dimensions, structure, and shape of roads specified in the MAP-compliant message;

for each determined confidence level related to each V2X-compliant message, comparing the confidence level to a predetermined threshold, for each confidence level related to each V2X-compliant message and when the confidence level is below the predetermined threshold, preventing a first action from being taken at the vehicle;

for each confidence level related to each V2X-compliant message and when the confidence level is above the predetermined threshold, performing a second action at the vehicle;

wherein the first action controls the operation of first components of the vehicle and the second action controls second components of the vehicle, wherein the second action includes at least one of: controlling braking components of the vehicle, controlling engine components of the vehicle, and controlling steering components of the vehicle.

12. The computer readable medium of claim 11, wherein the traffic safety device comprises a traffic light or other safety device.

13. The computer readable medium of claim 11, wherein the geographic transportation features comprise geographic position information concerning an intersection and streets comprising the intersection, or features of a roadway.

14. The computer readable medium of claim 11, wherein the first action and second action control braking components of the vehicle, control engine components of the vehicle, control steering components of the vehicle, or send instructions via a communication network.

15. The computer readable medium of claim 11, wherein the vehicle is an automated vehicle or a semi-automated vehicle.

\* \* \* \* \*